(12) United States Patent
Koifman et al.

(10) Patent No.: US 9,930,278 B2
(45) Date of Patent: Mar. 27, 2018

(54) READOUT CIRCUIT COUPLED VIA A COUPLING LINE TO A PIXEL AND A METHOD FOR READING A PIXEL USING CAPACITANCE OF THE COUPLING LINE

(71) Applicant: Analog Value LTD., Rishon Lezion (IL)

(72) Inventors: Vladimir Koifman, Rishon Lezion (IL); Tiberiu Galambos, Binyamina (IL)

(73) Assignee: ANALOG VALUE LTD., Herzliya (IL)

( * ) Notice: Subject to any disclaimer, the term of this patent is extended or adjusted under 35 U.S.C. 154(b) by 0 days.

(21) Appl. No.: 14/923,678

(22) Filed: Oct. 27, 2015

(65) Prior Publication Data

US 2017/0118426 A1  Apr. 27, 2017

(51) Int. Cl.
*H04N 5/3745*  (2011.01)
*H04N 5/378*  (2011.01)
*H04N 5/335*  (2011.01)

(52) U.S. Cl.
CPC ......... *H04N 5/378* (2013.01); *H04N 5/37455* (2013.01); *H04N 5/335* (2013.01)

(58) Field of Classification Search
CPC .............................. H04N 5/378; H04N 5/335
See application file for complete search history.

(56) References Cited

U.S. PATENT DOCUMENTS

2014/0104470 A1\* 4/2014 Sanada ................... H04N 5/378
348/300

\* cited by examiner

*Primary Examiner* — Ahmed A Berhan
(74) *Attorney, Agent, or Firm* — Reches Patents

(57) ABSTRACT

A device that may include a pixel and a readout circuit, wherein the pixel is coupled to the readout circuit via coupling lines that comprises an output line and a reset line; wherein the readout circuit comprises (a) a comparator that is configured to track a coupling line electrical parameter to generate a pulse that is responsive to value of the electrical parameter, and (b) a pulse width to digital converter for outputting a digital output signal that is responsive to a width of the pulse.

8 Claims, 14 Drawing Sheets

READOUT CIRCUIT COUPLED VIA A COUPLING LINE TO A PIXEL AND A METHOD FOR READING A PIXEL USING CAPACITANCE OF THE COUPLING LINE

BACKGROUND

Contemporary image sensors employ 4T pixel array implementing correlated double sampling (CDS) and column parallel analog to digital converter (ADC) structures, usually based on ramp based time to digital implementations. Each column in this case contains (besides the digital register/counter) a comparator that records the cross of the sampled voltage (reset or exposure value) with a ramp voltage that is common to all columns.

There is a growing need to reduce the size and cost of pixels and ADC structures.

SUMMARY

According to an embodiment of the invention there may be provided a device that may include a pixel and a readout circuit, wherein the pixel is coupled to the readout circuit via coupling lines that comprises an output line and a reset line; wherein the readout circuit comprises (a) a comparator that is configured to track a coupling line electrical parameter to generate a pulse that is responsive to value of the electrical parameter, and (b) a pulse width to digital converter for outputting a digital output signal that is responsive to a width of the pulse.

The coupling electrical parameter may be an electrical parameter of the reset line.

The electrical parameter of the reset line may be a reset line voltage developed on the reset line.

The readout circuit may include a current source for charging the bit line by supplying a predefined current to the bit line; wherein the pixel may include an output transistor; wherein a state of the output transistor is determined, at least in part, in response to a level of a bit line voltage developed on the bit line; wherein a value of the reset line voltage is responsive to the state of the output transistor.

During a reset phase of a double sampling process the output transistor may be configured to change a state from a closed state to an open state when the bit line voltage equals a reset level minus a threshold voltage of the output transistor.

The device wherein during a read phase of a double sampling process the output transistor may be configured to change a state from a closed state to an open state when the bit line voltage equals a floating diffusion level minus a threshold voltage of the output transistor; wherein the floating diffusion level reflects an amount of light sensed by a photodiode of the pixel.

The comparator may include a comparing transistor that has a gate that is coupled to the reset line.

The electrical parameter of the reset line may be a reset line current that flows through the reset line.

The coupling electrical parameter may be an electrical parameter of the output line.

The electrical parameter of the output line may be an output line voltage developed on the output line.

The read circuit may include an intermediate transistor that is coupled between the output line and one or more transistor of the comparator; wherein a state of the intermediate transistor reflects the output line voltage.

According to an embodiment of the invention there may be provided a method for reading a pixel, the method may include tracking, by a comparator of a readout circuit, a coupling line electrical parameter to generate a pulse that is responsive to value of the electrical parameter; wherein the coupling line is selected from an output line and a reset line; wherein the output line and the reset line couple the pixel to the readout circuit; and generating, by a pulse width to digital converter of the readout circuit, a digital output signal that is responsive to a width of the pulse.

The coupling electrical parameter is an electrical parameter of the reset line.

The electrical parameter of the reset line is a reset line voltage developed on the reset line.

The method may include charging, by a current source of the readout circuit, the bit line by supplying a predefined current to the bit line; wherein the pixel may include an output transistor; wherein the method may include determining a state of the output transistor, at least in part, in response to a level of a bit line voltage developed on the bit line; wherein a value of the reset line voltage is responsive to the state of the output transistor.

The method may include changing a state, during a reset phase of a double sampling process, of the output transistor from a closed state to an open state when the bit line voltage equals a reset level minus a threshold voltage of the output transistor.

The method may include changing a state, during a read phase of a double sampling process, of the output transistor from a closed state to an open state when the bit line voltage equals a floating diffusion level minus a threshold voltage of the output transistor; wherein the floating diffusion level reflects an amount of light sensed by a photodiode of the pixel.

The comparator may include a comparing transistor that has a gate that is coupled to the reset line.

The electrical parameter of the reset line is a reset line current that flows through the reset line.

The coupling electrical parameter is an electrical parameter of the output line.

The electrical parameter of the output line is an output line voltage developed on the output line.

The read circuit may include an intermediate transistor that is coupled between the output line and one or more transistor of the comparator; wherein a state of the intermediate transistor reflects the output line voltage.

According to an embodiment of the invention there may be provided a method for reading a pixel, the method may include: counting, by a counter of a readout circuit, a delay between (i) an edge of a select signal provided to a select transistor of the pixel, and (ii) an edge of an output voltage that propagates over a reset line that is coupled between the pixel and the readout circuit; and generating, by a delay to digital converter of the readout circuit, a digital output signal that is responsive to the delay.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

DETAILED DESCRIPTION OF THE DRAWINGS

Figure 1A:
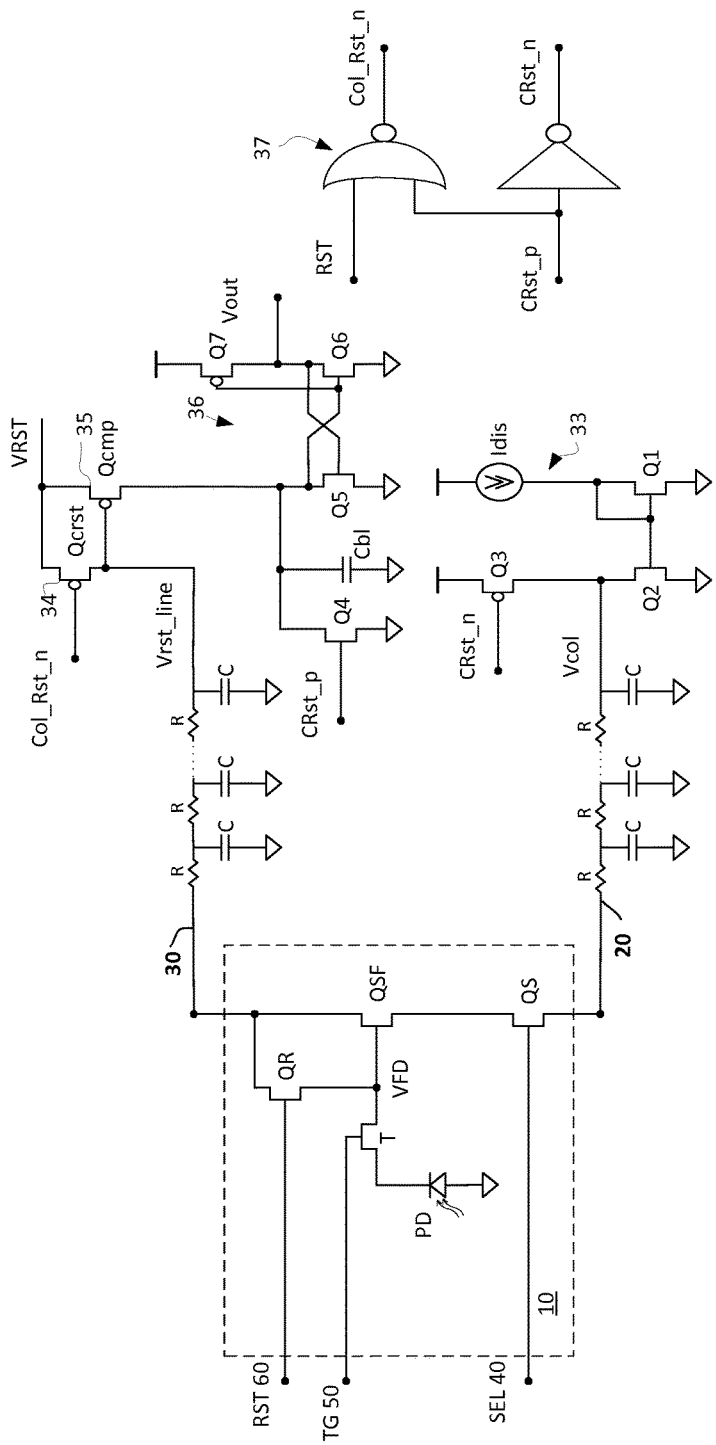
FIG. 1A illustrates a pixel, a readout circuit as well as reset and an output lines that are coupled between the pixel and the readout circuit according to an embodiment of the invention.

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

Because the illustrated embodiments of the present invention may for the most part, be implemented using electronic components and circuits known to those skilled in the art, details will not be explained in any greater extent than that considered necessary as illustrated above, for the understanding and appreciation of the underlying concepts of the present invention and in order not to obfuscate or distract from the teachings of the present invention.

Any reference in the specification to a method should be applied mutatis mutandis to a system capable of executing the method.

Any reference in the specification to a system should be applied mutatis mutandis to a method that may be executed by the system.

Figure 5:
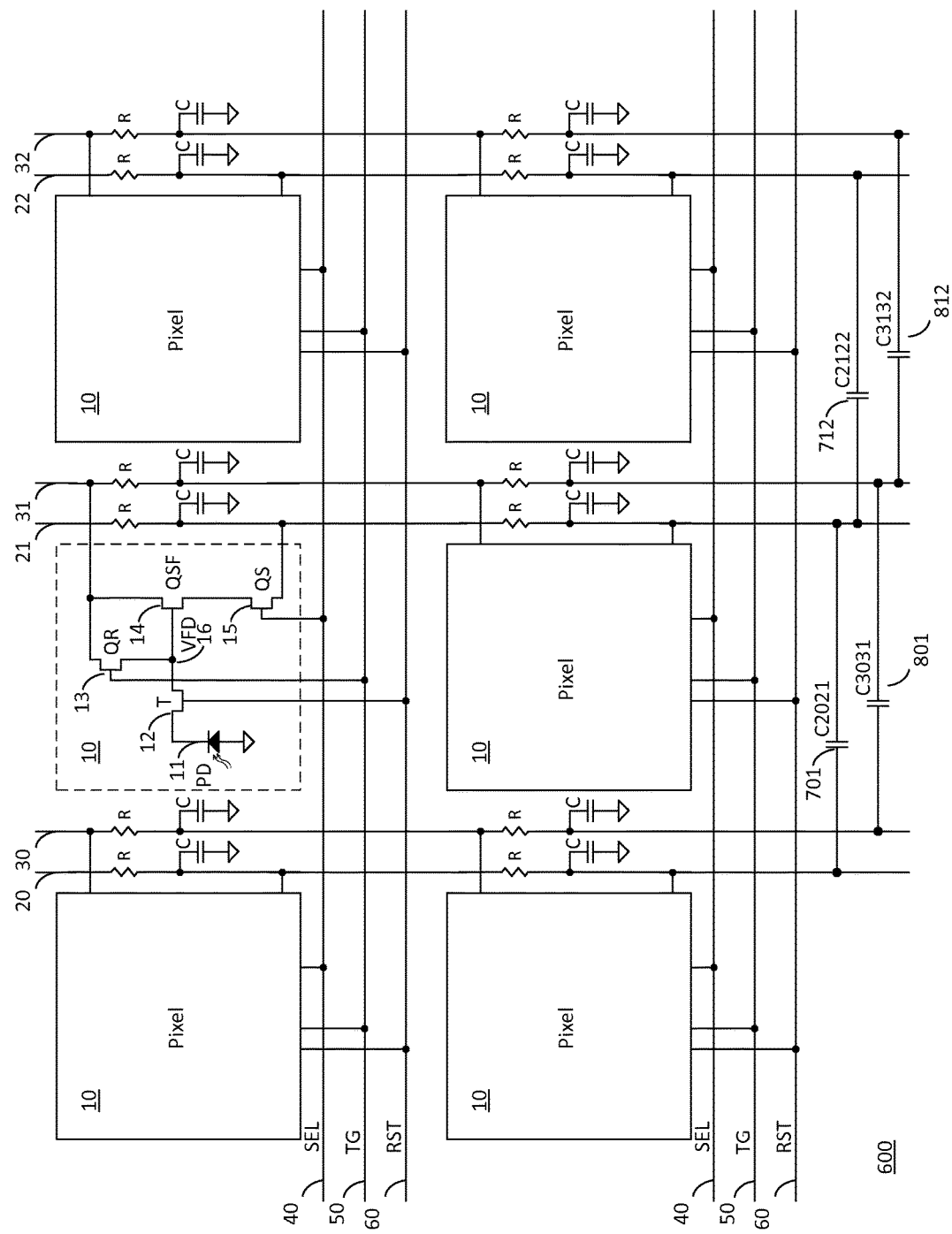
FIG. 5 illustrates multiple pixels and various lines coupled to the pixels according to an embodiment of the invention.

According to various embodiment of the invention there is provided a device that includes A typical image sensor array with the elements that will be referred to in this disclosure is shown in FIG. 5. The array is formed of pixels 10, shown here as four transistor (4T) pixels without any device sharing. The invention applies to other types of pixels too (for example, three, five or six transistor pixels—3T, 5T, 6T, with or without sharing). The image sensor array is routed by a two-dimensional mesh of conductors that in the case shown here are the vertical reset voltage supplying lines 30, 31, 32, vertical column output lines 20, 21, 22, horizontal select lines 40, transfer gate lines 50 and reset lines 60.

According to an embodiment of the invention the readout circuit makes use of the parasitic capacitance to ground of the vertical column output and vertical reset voltage supply lines to build a ramp ADC structure. As it will be shown below, parasitic coupling capacitances between adjacent columns 701, 712, 801, 802 can have an unwanted effect upon the readout circuits and therefore a technique is proposed to avoid this.

According to various embodiments of the invention the readout circuit does not include dedicated ADC ramp voltage circuits for generating the ramp voltage that is common to all columns.

According to an embodiments of the invention the ramp is generated by using the capacitance of the column output line (20,21,22) and/or the capacitance of the column reset voltage supply line (30,31,32) for generating the ramp of the column ADC.

According to an embodiments of the invention the readout event on the ramp is generated by sensing the turning on/off of an output transistor of the pixel (such as a source follower) and feeding a comparator with a signal that is indicative of the state of the output transistor of the pixel.

Figure 6:
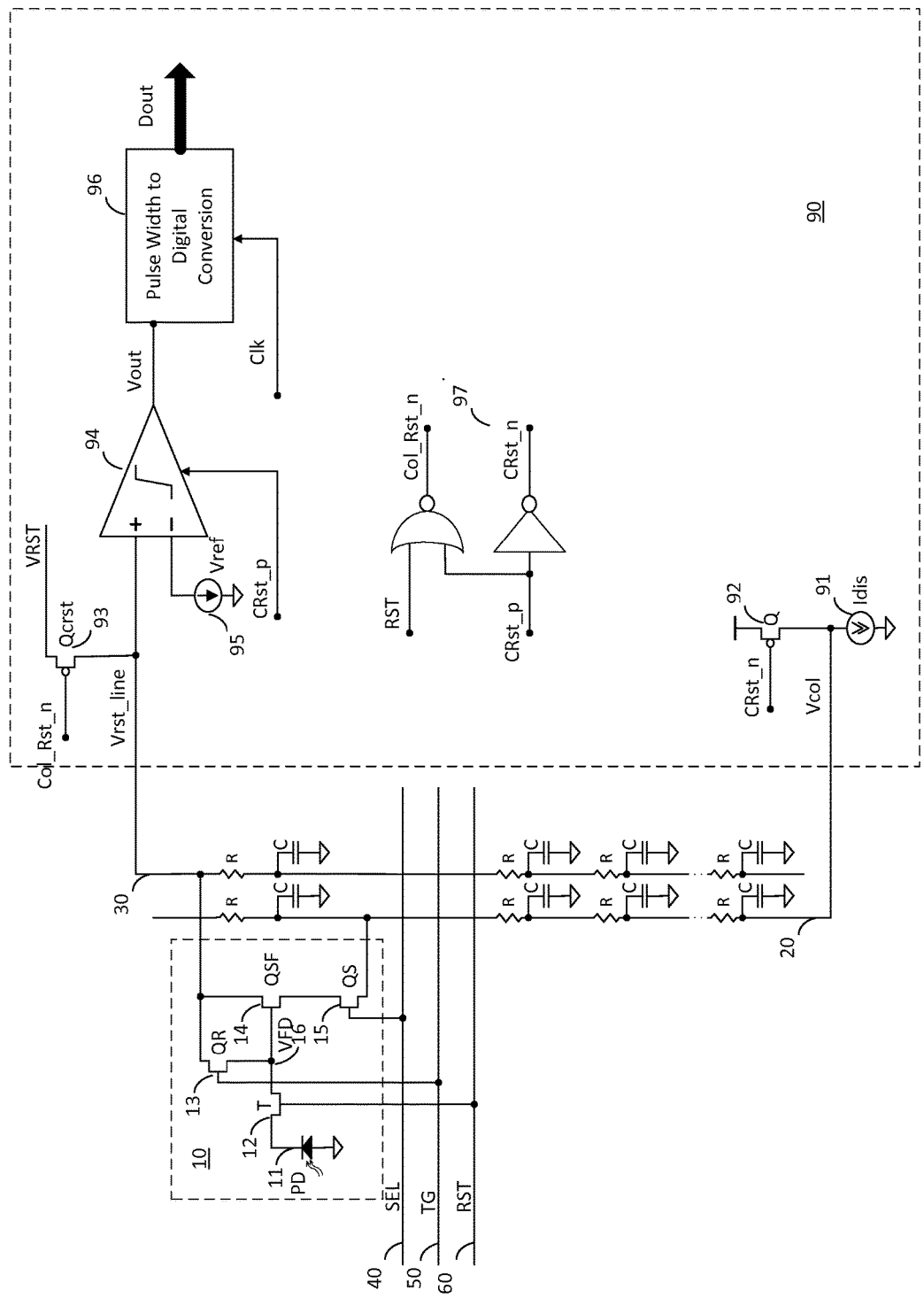
FIG. 6 illustrates a pixel, a readout circuit as well as reset and an output lines that are coupled between the pixel and the readout circuit according to an embodiment of the invention.
Figure 7:
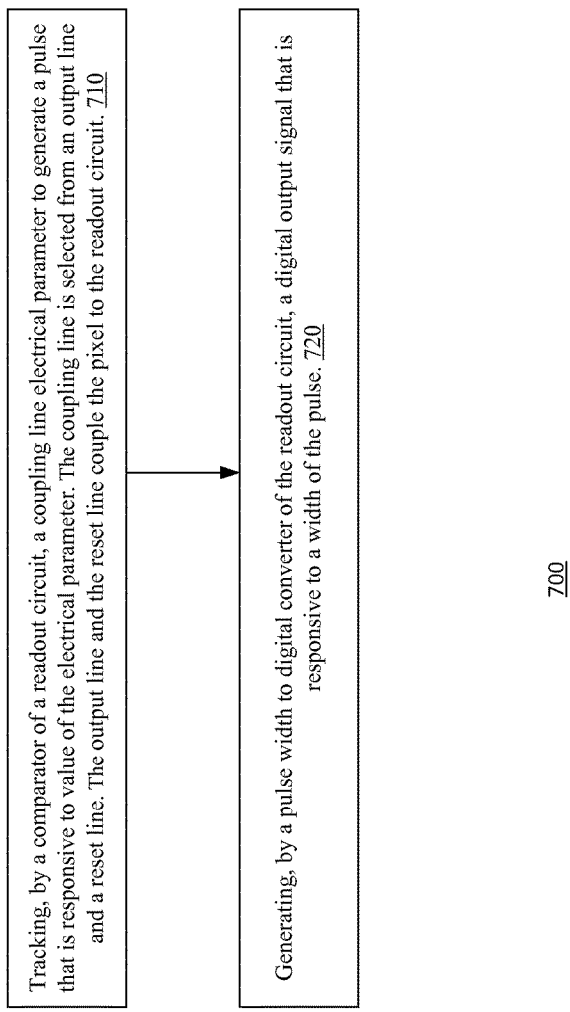
FIG. 7 illustrates a method according to an embodiment of the invention.
Figure 8:
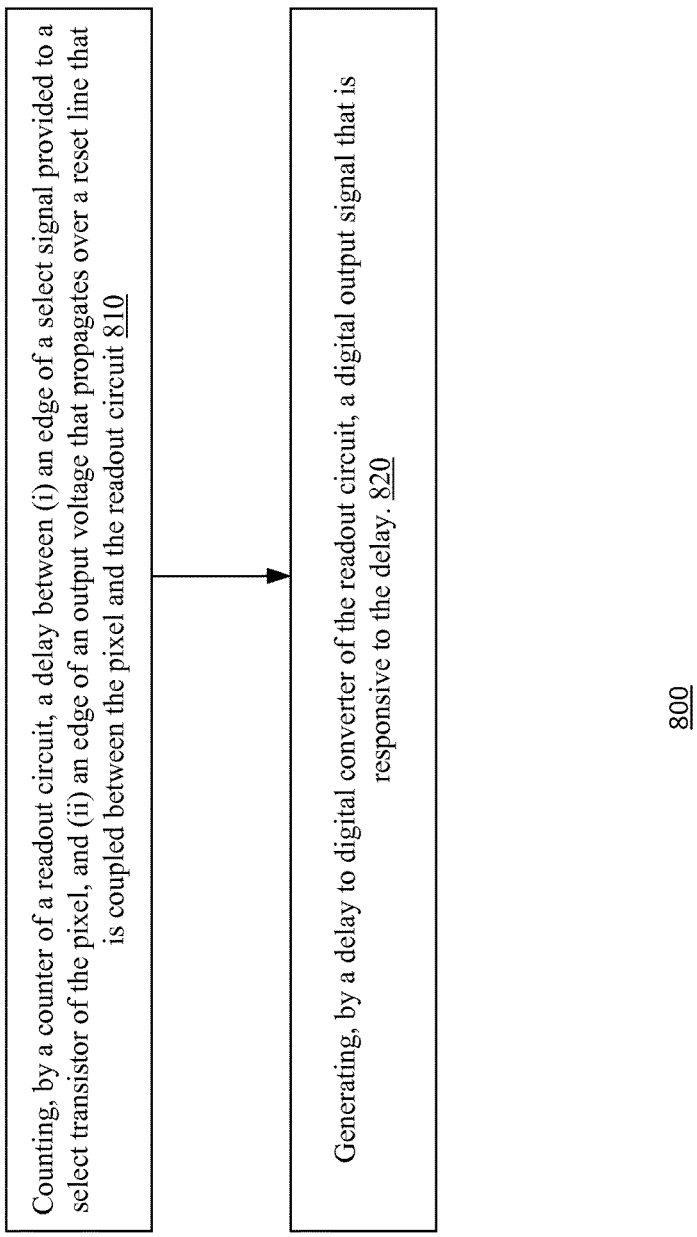
FIG. 8 illustrates a method according to an embodiment of the invention.

FIG. 6 illustrates a device according to an embodiment of the invention.

Pixel 10 is connected via column output line 20 and column reset voltage supply line 30 to column readout circuit 90. The readout circuit includes a current source 91 (that can be and will usually be implemented as a current mirror but it is not necessarily a current mirror), column output line reset device 92, column reset voltage line switch 93, comparator 94 that detects the crossing of the column reset line voltage below the reference voltage 95. The readout values encoded into the width of the pulse on signal Vout are converted into a digital representation by pulse width to digital conversion circuit 96. Control signal generating logic is marked 97

FIG. 1A illustrates a pixel, a readout circuit as well as reset and an output lines that are coupled between the pixel and the readout circuit according to an embodiment of the invention.

In FIG. 1A the readout circuit performs a comparison (and generates a pulse) based on the state of the source follower in the pixel.

In FIG. 1A the readout circuit monitors when the voltage Vrst_line on the column reset supply line 30 reaches the level defined by the reset voltage VRST minus the threshold voltage of compare transistor Qcmp and generates a pulse accordingly.

The voltage difference on the column reset supply line from the moment it is reset to the instance of compare is defined by the threshold voltage of compare transistor Qcmp, achieving a constant charge transferred through the source follower.

Figure 1B:
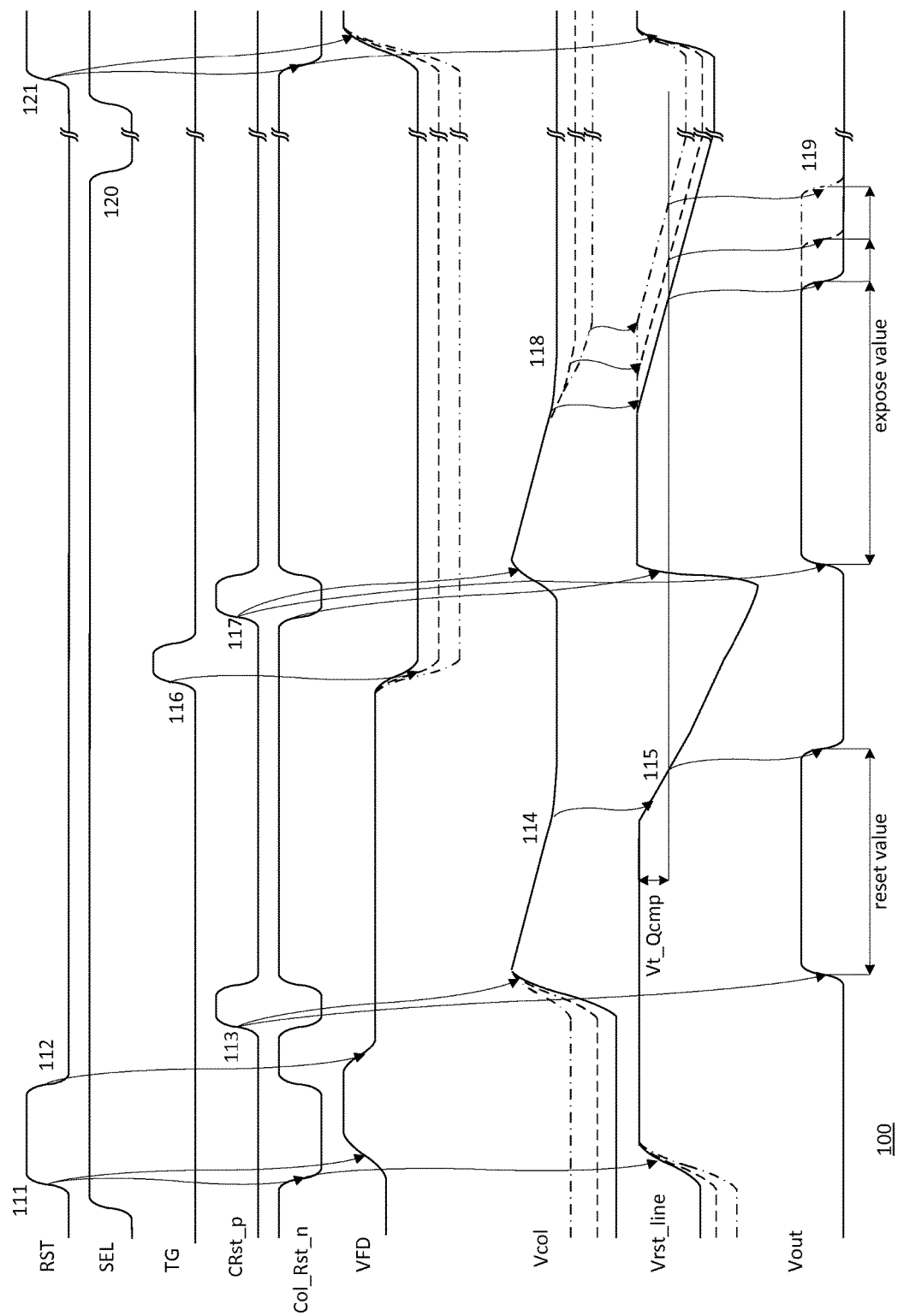
FIG. 1B illustrates waveforms of some signals of the pixel and the readout circuit of FIG. 1A according to an embodiment of the invention.

The current through the pixel is controlled by current source Idis (for example, can be applied to the column output line by means of a current mirror Q1, Q2). Thus the constant charge condition explained above will result in a constant delay from the instance the source follower QSF in pixel 10 starts to conduct to the switching of the comparator. Referring to FIG. 1B, the constant charge transfer condition means a constant delay condition from event 114 to event 115 (for readout of the reset value) and from event 118 to event 119 (for readout of the exposed value).

Referring to FIG. 6—the reference voltage 95 connected to comparator 94 is used to achieve the same condition of constant charge transferred through the source follower device 14. In FIG. 1A the readout circuit has a comparator that uses the threshold voltage of device Qcmp as the reference voltage. The sensing circuitry of the comparator is built by means of the cross-coupled (regenerative, positive feedback structure Q5, Q6, Q7).

The slope of the column reset voltage line signal as well as the slope of the column output line signal in the various implementations can be adapted to the specific implementations of the comparators used.

Referring to FIG. 1B, the actual charge/voltage to time conversion is dependent on the position of events 114 and 118. Discharge of the column output line from supply to the point where the source follower device in the pixel turns on contains a portion of overhead time that can be mitigated by injecting a constant charge into the line. This can be done either by switched capacitor technique or by a switched current source, both techniques actually accelerating the initial part of the discharge so as to get as fast as possible to the useful range of voltages.

In FIG. 1A band-limiting capacitor Cbl limits the possible influence of the system noise on the comparator operation.

A cross-talk between adjacent columns can be mitigated by interleaved readout—interleaving the phases of the CDR between odd and even columns.

Referring to FIG. 5—parasitic coupling capacitances between adjacent columns (701, 712,801, 812) might cause unwanted dependency of the readout result in a given column (in this case the central one) on the readout results of the adjacent columns. This problem can be avoided if the readout is done in a sequential interleaved fashion: first read out even columns (with the vertical wires 20, 22 and 30, 32 having ramping signals and vertical wires 21 and 31 are kept at constant voltages and act as shields) then read out odd columns (with the vertical wires 21 and 31 having ramping signals and vertical wires 20, 22 and 30, 32 are kept at constant voltages and act as shields). There might be other ways of interleaving of the column read process, for example, only one out of four columns is read at a time.

FIG. 1B illustrates various waveforms of the device of FIG. 1A according to an embodiment of the invention.

FIG. 1B illustrates signals RST, SEL, TG, CRst_p, Col_Rst_n, VFD, Vcol, Vrst_line and Vout.

FIG. 1B illustrates the following sequence of events:

a. 111—The line we intend to read out is selected and the pixel is reset (via reset line and column reset PFET Qcrst)

b. 112—Reset is switched to low. The floating diffusion gets at this stage the charge injection from turn off of the reset transistor and the reset (kT/C) noise associated with it. The floating diffusion will settle after this event to the reset level that needs to be read out.

c. 113—The reset line is charged to VRST (via Qcrst), the bit line (Vcol) is charged to VDD or other voltage source (that is usually lower than VRST) and the output comparator is reset in order to start the conversion of the reset value. The bit line Vcol is now discharged in a linear fashion by the current mirrored from Idis (Q1, Q2).

d. 114—When the bit line reaches the voltage level of VFD−Vt_QSF the source follower starts to conduct and current is diverted from discharging the bit line and the discharge of the reset line begins.

e. 115—When the reset line has discharged to a level of VRST−Vt_Qcmp the detecting PMOS device Qcmp starts to conduct and flips over the positive feedback comparator stage (Q5, Q6, Q7). This completes the voltage to time conversion of the reset value. Note that the charge passed from the reset line in order to achieve this trigger point is constant (Q=Crst_line*Vt_Qcmp).

f. 116—When the exposure time of the pixel passed, the transfer gate TG receives a pulse that transfers the exposure charge to the floating diffusion. The floating diffusion voltage VFD will now settle to the exposure value that needs to be read out.

g. 117—The reset line is charged to VRST (via Qcrst), the bit line (Vcol) is charged to VDD or other voltage source (that is usually lower than VRST) and the output comparator is reset in order to start the conversion of the exposure value. The bit line Vcol is now discharged in a linear fashion by the current mirrored from Idis (Q1, Q2).

h. 118—When the bit line reaches the voltage level of VFD−Vt_QSF the source follower starts to conduct and current is diverted from discharging the bit line and the discharge of the reset line begins.

i. 119—When the reset line has discharged to a level of VRST−Vt_Qcmp the detecting PMOS device Qcmp starts to conduct and flips over the positive feedback comparator stage (Q5, Q6, Q7). This completes the voltage to time conversion of the exposure value. Note that the charge passed from the reset line in order to achieve this trigger point is constant (Q=Crst_line*Vt_Qcmp) (and the offset effectively cancels out the offset applied to the reset value in stage 115).

j. 120—When the readout of the exposed value of the pixel is complete, the select line can be turned off permitting readout of other lines in the array.

k. 121—The cycle continues, the line is selected and the pixel is reset again (121).

Figure 1C:
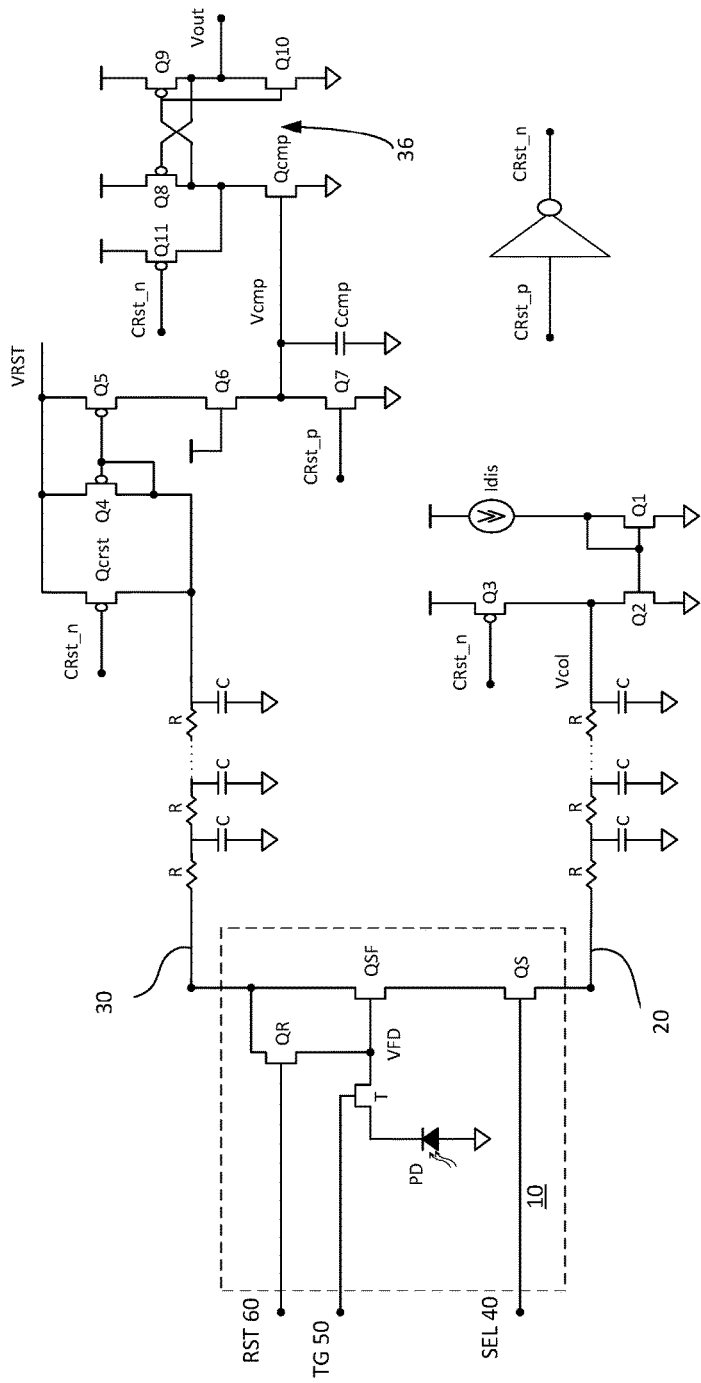
FIG. 1C illustrates a pixel, a readout circuit as well as reset and an output lines that are coupled between the pixel and the readout circuit according to an embodiment of the invention.
Figure 1D:
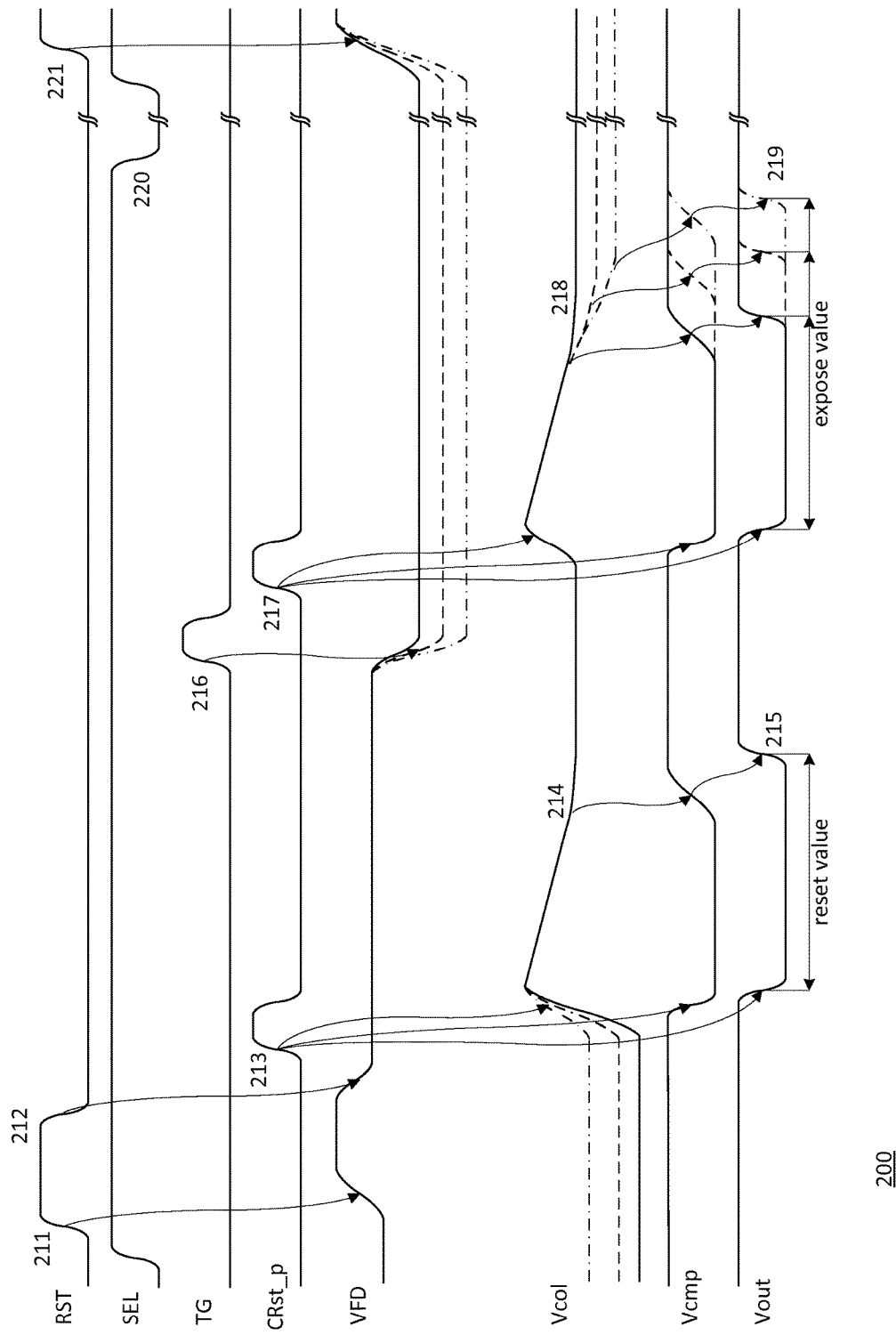
FIG. 1D illustrates waveforms of some signals of the pixel and the readout circuit of FIG. 1C according to an embodiment of the invention.

FIG. 1C illustrates a pixel, a readout circuit as well as reset and an output lines that are coupled between the pixel and the readout circuit according to an embodiment of the invention. FIG. 1D illustrates waveforms of some signals of the pixel and the readout circuit of FIG. 1C according to an embodiment of the invention.

The readout circuit of FIG. 1C detects a turn on of the source follower by sensing the column current. The bit line is pre-charged to supply and discharged in a linear fashion.

FIG. 1D illustrates the following sequence of events:

a. 211—The line we intend to read out is selected and the pixel is reset (via reset line and softly via diode connected device Q4)

b. 212—Reset is switched to low. The floating diffusion gets at this stage the charge injection from turn off of the reset transistor and the reset (kT/C) noise associated with it. The floating diffusion will settle after this event to the reset level that needs to be read out.

c. 213—The reset line is charged to VRST (via Qcrst), the bit line (Vcol) is charged to VDD or other voltage source (that is usually lower than VRST, via Q3) and the output comparator is reset in order to start the conversion of the reset value. The bit line Vcol is now discharged in a linear fashion by the current mirrored from Idis (Q1, Q2).

d. 214—When the bit line reaches the voltage level of VFD−Vt_QSF the source follower starts to conduct and current is diverted from discharging the bit line, is copied over via current mirror Q4, Q5 and starts to charge capacitor Ccmp. It is to be noted that the function of Q4, Q5 can be implemented by a switched capacitor solution too.

e. 215—When the voltage on capacitor Ccmp has charged to a level of Vt_Qcmp the detecting NMOS device Qcmp starts to conduct and flips over the positive feedback comparator stage (Q8, Q9, Q10). This completes the voltage to time conversion of the reset value. Note that the charge passed from the reset line in order to achieve this trigger point is constant (Q=Ccmp*Vt_Qcmp).

f. 216—When the readout of the reset value of the pixel is complete, the transfer gate TG receives a pulse that transfers the exposure charge to the floating diffusion. The floating diffusion voltage VFD will now settle to the exposure value that needs to be read out.

g. 217—The reset line is charged to VRST (via Qcrst), the bit line (Vcol) is charged to VDD or another voltage source (that is usually lower than VRST, via Q3) and the output comparator is reset in order to start the conversion of the exposure value. The bit line Vcol is now discharged in a linear fashion by the current mirrored from Idis (Q1, Q2).

h. 218—When the bit line reaches the voltage level of VFD−Vt_QSF the source follower starts to conduct and current is diverted from discharging the bit line, is copied over via current mirror Q4, Q5 and starts to charge capacitor Ccmp.

i. 219—When the voltage on capacitor Ccmp has charged to a level of Vt_Qcmp the detecting NMOS device Qcmp starts to conduct and flips over the positive feedback comparator stage (Q8, Q9, Q10). This completes the voltage to time conversion of the exposed value. Note that the charge passed from the reset line in order to achieve this trigger point is constant (Q=Ccmp*Vt_Qcmp) (and the offset effectively cancels out the offset applied to the reset value in stage 215).

j. 220—When the conversion of the exposure value is completed, the select line can be turned off to permit readout of other lines in the array.

k. 221—The cycle continues the line is selected and the pixel is reset again (221).

Figure 2A:
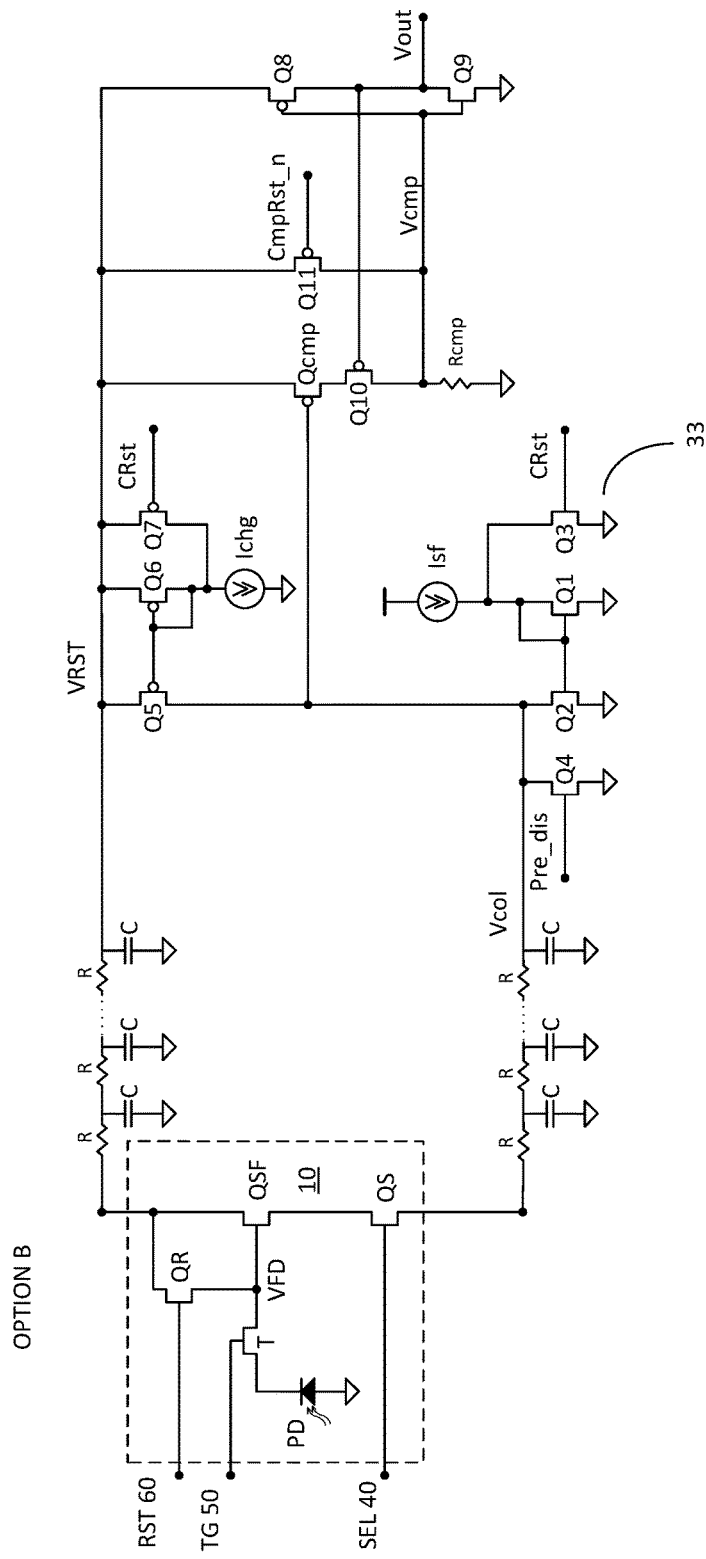
FIG. 2A illustrates a pixel, a readout circuit as well as reset and an output lines that are coupled between the pixel and the readout circuit according to an embodiment of the invention.
Figure 2B:
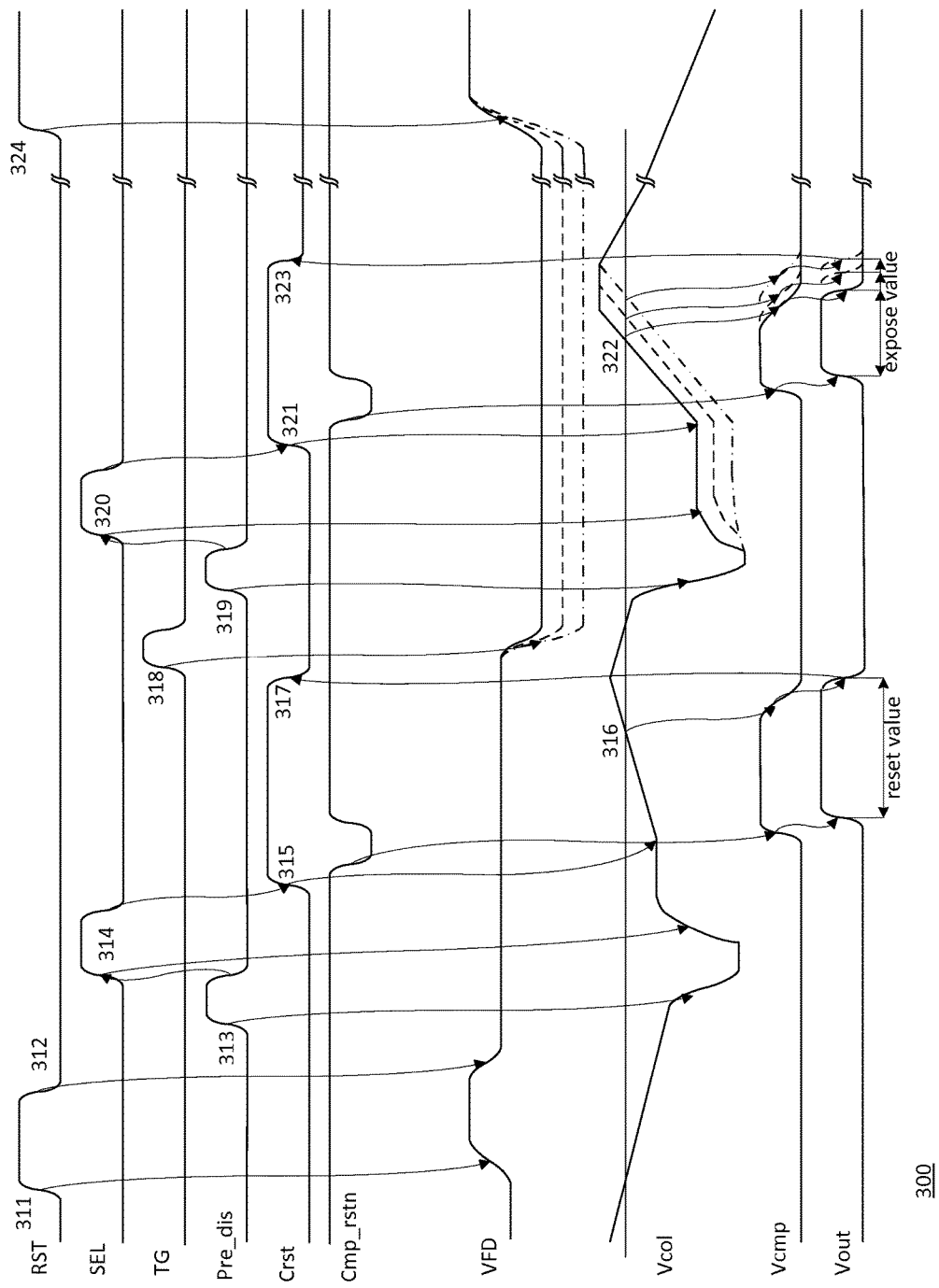
FIG. 2B illustrates waveforms of some signals of the pixel and the readout circuit of FIG. 2A according to an embodiment of the invention.

FIG. 2A illustrates a pixel, a readout circuit as well as reset and an output lines that are coupled between the pixel and the readout circuit according to an embodiment of the invention. FIG. 2B illustrates waveforms of some signals of the pixel and the readout circuit of FIG. 2A according to an embodiment of the invention.

Bit line samples both reset and post exposure value and is then linearly charged. The bit line is pre-discharged to ground to accelerate source follower settling. After the settling the bit line is charged in a linear fashion and the conversion uses a simple comparator related to the supply voltage.

In FIG. 2A the device uses only the capacitance of the column output line to build the ADC ramp and do not use the source follower in the pixel as comparator.

The voltage span available for the ramp signal is limited between the readout voltage of the pixel (note that the source follower device does not take part in the comparison process) and the comparator reference voltage that in this case is VRST−Vt_Qcmp.

FIG. 2B illustrates the following sequence of events:

a. 311—Reset the pixel (directly via reset line)

b. 312—Reset is switched to low. The floating diffusion gets at this stage the charge injection from turn off of the reset transistor and the reset (kT/C) noise associated with it. The floating diffusion will settle after this event to the reset level that needs to be read out.

c. 313—The bit line (Vcol) is discharged to ground and the bias current of the source follower is turned on (switch Q3 turns off and current source Isf is mirrored via Q1, Q2) to the bit line.

d. 314—The SEL line is pulsed for a time long enough to permit the bit line to settle to the reset value.

e. 315—The output comparator is reset in order to start the conversion of the reset value. The bit line Vcol is now charged in a linear fashion by the current mirrored from Ichg (Q5, Q6).

f. 316—When the bit line reaches the voltage level of VRST−Vt_Qcmp the PMOS device Qcmp stops to conduct and flips over the comparator stage (Q8, Q9, Q10, Rcmp). This completes the voltage to time conversion of the reset value.

g. 317—When the readout of the reset value is complete, the charging of the bit line Vcol is stopped and it's discharge begins.

h. 318—The transfer gate TG receives a pulse that transfers the exposure charge to the floating diffusion. The floating diffusion voltage VFD will now settle to the exposure value that needs to be read out.

i. 319—The bit line (Vcol) is discharged to ground and the bias current of the source follower is turned on (switch Q3 turns off and current source Isf is mirrored via Q1, Q2) to the bit line.

j. 320—The SEL line is pulsed for a time long enough to permit the bit line to settle to the exposure value.

k. 321—The output comparator is reset in order to start the conversion of the exposure value. The bit line Vcol is now charged in a linear fashion by the current mirrored from Ichg (Q5, Q6).

l. 322—When the bit line reaches the voltage level of VRST−Vt_Qcmp the PMOS device Qcmp stops to conduct and flips over the comparator stage (Q8, Q9, Q10, Rcmp). This completes the voltage to time conversion of the exposure value.

m. 323—When the readout of the exposure value is complete, the charging of the bit line Vcol is stopped and it's discharge begins.

n. 324—The cycle continues and the pixel is reset again (324).

Figure 3A:
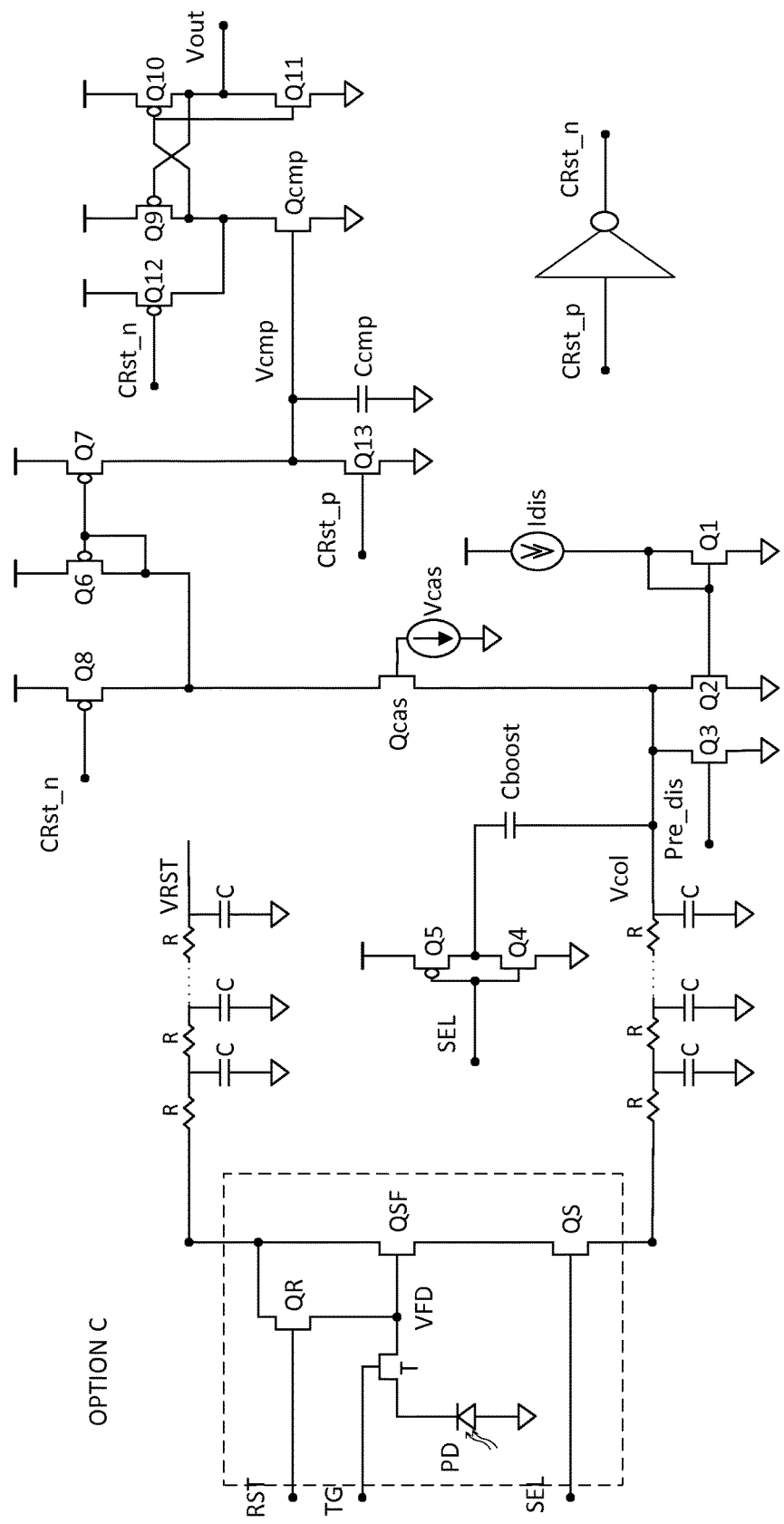
FIG. 3A illustrates a pixel, a readout circuit as well as reset and an output lines that are coupled between the pixel and the readout circuit according to an embodiment of the invention.
Figure 3B:
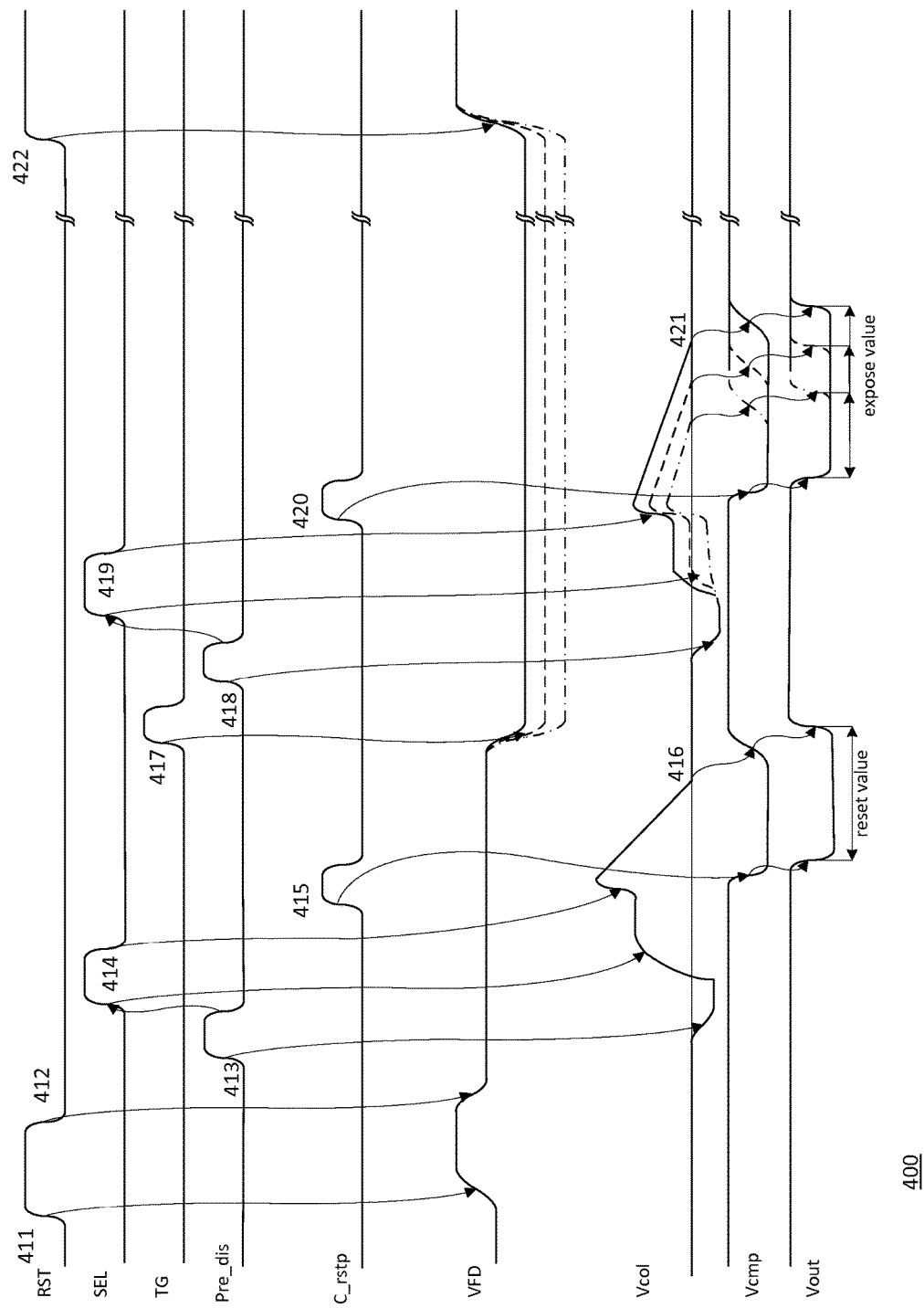
FIG. 3B illustrates waveforms of some signals of the pixel and the readout circuit of FIG. 3A according to an embodiment of the invention.

FIG. 3A illustrates a pixel, a readout circuit as well as reset and an output lines that are coupled between the pixel and the readout circuit according to an embodiment of the invention. FIG. 3B illustrates waveforms of some signals of the pixel and the readout circuit of FIG. 3A according to an embodiment of the invention.

This device performs a compare based on cascode device Qcas turning on.

FIG. 3B illustrates the following sequence of events:

a. 411—Reset the pixel (directly via reset line)

b. 412—Reset is switched to low. The floating diffusion gets at this stage the charge injection from turn off of the reset transistor and the reset (kT/C) noise associated with it. The floating diffusion will settle after this event to the reset level that needs to be read out.

c. 413—The bit line (Vcol) is discharged to ground and then (when Pre_dis signal is switched low) the bias current of the source follower is provided by source Idis is mirrored via Q1, Q2 to the bit line.

d. 414—The SEL line is pulsed for a time long enough to permit the bit line to settle to the reset value. In addition to this, the select signal is also used to achieve a constant voltage step on the bit line as follows: when the select line is high, capacitor Cboost is discharged via NMOS device Q4 to ground. When the SEL pulse ends, the capacitor is switched from ground to VDD (via PMOS device Q5) thus injecting into the column line a constant charge proportional to Cboost*VDD.

e. 415—The output comparator is reset in order to start the conversion of the reset value. The bit line Vcol is now discharged in a linear fashion by the current mirrored from Idis (Q1, Q2).

f. 416—When the bit line reaches the voltage level of Vcas-Vt_Qcas the NMOS device Qcas starts to conduct and current is diverted from discharging the bit line, is copied over via current mirror Q6, Q7 and starts to charge capacitor Ccmp. When the voltage on capacitor Ccmp has charged to a level of Vt_Qcmp the detecting NMOS device Qcmp starts to conduct and flips over the positive feedback comparator stage (Q9, Q10, Q11). This completes the voltage to time conversion of the reset value. Note that the charge passed from the reset line in order to achieve this trigger point is constant (Q=Ccmp*Vt_Qcmp).

g. 417—When the readout of the reset value is complete, the transfer gate TG receives a pulse that transfers the exposure charge to the floating diffusion. The floating diffusion voltage VFD will now settle to the exposure value that needs to be read out.

h. 418—The bit line (Vcol) is discharged to ground and the bias current of the source follower is provided by source Idis is mirrored via Q1, Q2 to the bit line.

i. 419—The SEL line is pulsed for a time long enough to permit the bit line to settle to the exposure value. In addition to this, the select signal is also used to achieve a constant voltage step on the bit line as follows: when the select line is high, capacitor Cboost is discharged via NMOS device Q4 to ground. When the SEL pulse ends, the capacitor is switched from ground to VDD (via PMOS device Q5) thus injecting into the column line a constant charge proportional to Cboost*VDD.

j. 420—The output comparator is reset in order to start the conversion of the exposure value. The bit line Vcol is now discharged in a linear fashion by the current mirrored from Idis (Q1, Q2).

k. 421—When the bit line reaches the voltage level of Vcas-Vt_Qcas the NMOS device Qcas starts to conduct and current is diverted from discharging the bit line, is copied over via current mirror Q6, Q7 and starts to charge capacitor Ccmp. When the voltage on capacitor Ccmp has charged to a level of Vt_Qcmp the detecting NMOS device Qcmp starts to conduct and flips over the positive feedback comparator stage (Q9, Q10, Q11). This completes the voltage to time conversion of the exposure value. Note that the charge passed from the reset line in order to achieve this trigger point is constant (Q=Ccmp*Vt_Qcmp). This completes the voltage to time conversion of the exposure value.

422—The cycle continues and the pixel is reset again (422).

Figure 4A:
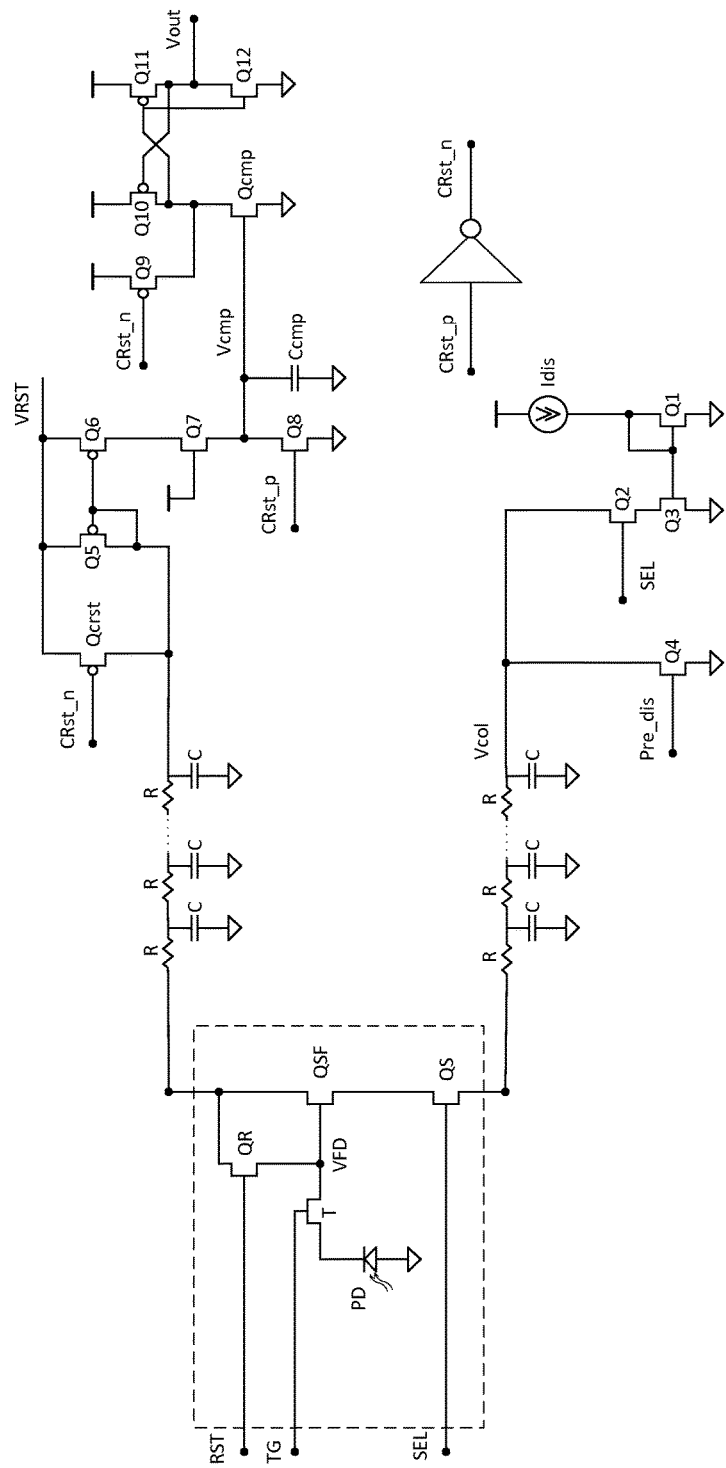
FIG. 4A illustrates a pixel, a readout circuit as well as reset and an output lines that are coupled between the pixel and the readout circuit according to an embodiment of the invention.
Figure 4B:
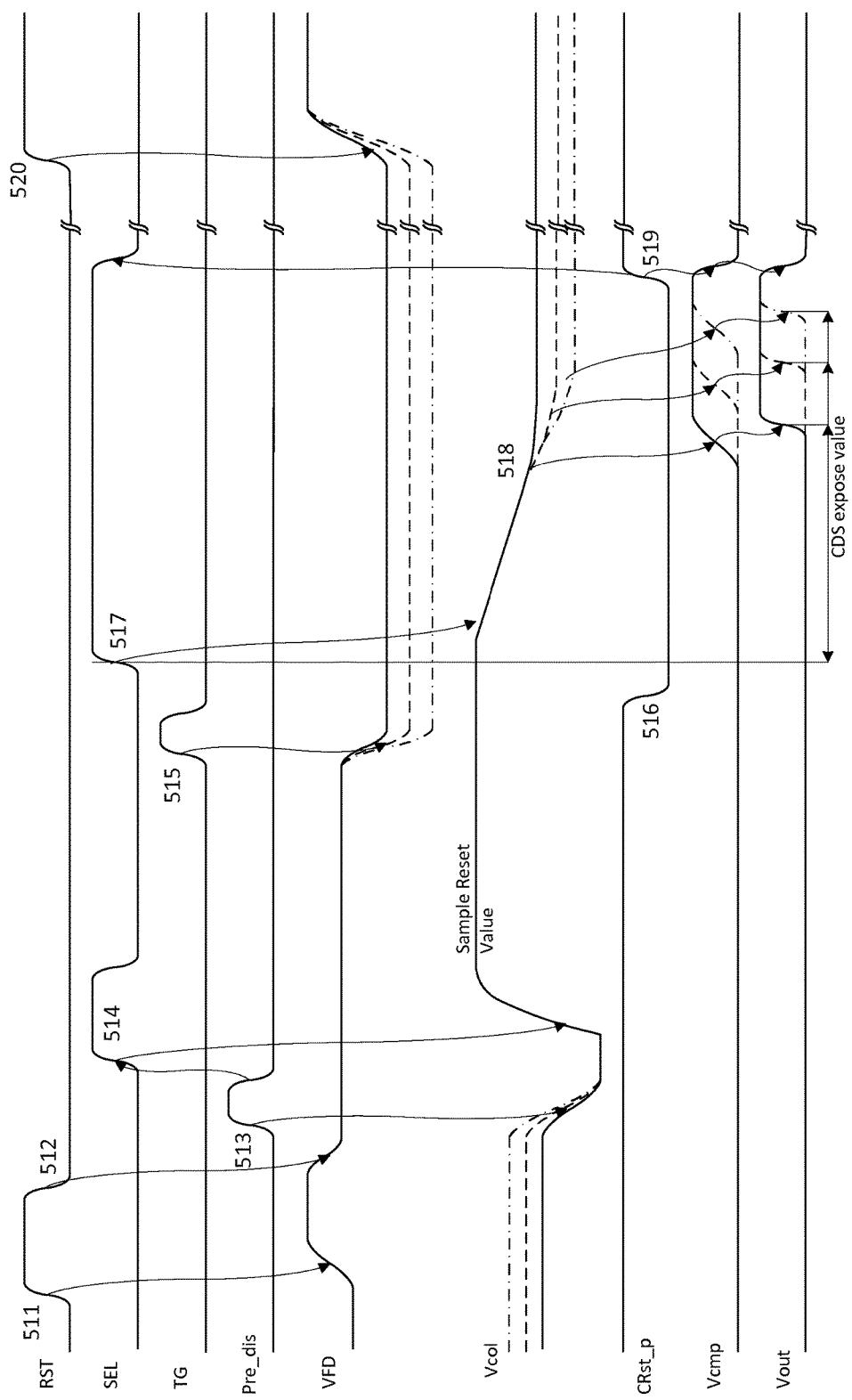
FIG. 4B illustrates waveforms of some signals of the pixel and the readout circuit of FIG. 4A according to an embodiment of the invention.

FIG. 4A illustrates a pixel, a readout circuit as well as reset and an output lines that are coupled between the pixel and the readout circuit according to an embodiment of the invention. FIG. 4B illustrates waveforms of some signals of the pixel and the readout circuit of FIG. 4A according to an embodiment of the invention.

The bit line is pre-charged to the reset value and discharged in a linear fashion.

The ramp signal here is confined between the reset value and the readout value. Reset value is read out in a conventional fashion, with the source follower biased by constant current while exposed value is read out indirectly by detecting the turn on of the source follower device. This will cause worse noise cancellation than a conventional readout where both reset and signal levels are read out the same way. On the other hand, this readout style achieves the CDS in the analog domain so has potential of being faster and/or lower power than other readout schemes.

FIG. 4B illustrates the following sequence of events:

a. 511—Reset the pixel (via reset line and softly via diode connected device Q5)

b. 512—Reset is switched to low. The floating diffusion gets at this stage the charge injection from turn off of the reset transistor and the reset (kT/C) noise associated with it. The floating diffusion will settle after this event to the reset level that needs to be read out.

c. 513—The bit line (Vcol) is discharged to ground and the bias current of the source follower is provided by source Idis is mirrored via Q1, Q3 and switch Q2 to the bit line.

d. 514—The SEL line is pulsed for a time long enough to permit the bit line to settle to the reset value.

e. 515—When the reset value has settled, the transfer gate TG receives a pulse that transfers the exposure charge to the floating diffusion. The floating diffusion voltage VFD will now settle to the exposure value that needs to be read out.

f. 516—Signal Crstp is switched to low preparing the comparator for the detection of the readout event.

g. 517—The rising edge of SEL signal starts the discharge of the bit line Vcol. The starting point of this discharge is at the reset value that is higher than the exposed value so initially the source follower in the pixel is off.

h. 518—When the bit line reaches the voltage level of VFD-Vt_QSF the source follower starts to conduct and current is diverted from discharging the bit line, is copied over via current mirror Q5, Q6 and starts to charge capacitor Ccmp. When the voltage on capacitor Ccmp has charged to a level of Vt_Qcmp the detecting NMOS device Qcmp starts to conduct and flips over the positive feedback comparator stage (Q10, Q11, Q12).

This completes the voltage to time conversion of the difference between the reset value and the exposed value.

i. 519—After the conversion is finished, the comparator is reset again.

j. 520—The cycle continues and the pixel is reset again (520).

There have been illustrated various embodiments of the invention. In FIGS. 1A and 1B—the readout circuit sensed the turn on of the source follower by monitoring reset line voltage (constant charge passed from output line to reset line). In FIGS. 1C and 1D the readout circuit was configured to sense the turn on of the source follower by monitoring the reset line current (integrated on capacitor Ccmp to achieve the same constant charge passed from output line to reset line). In FIGS. 2A, 2B, 3A and 3B the capacitance of the output line is used for generating on it the ramp for voltage to time conversion.

In FIGS. 4A and 4B reset value readout is done on a conventional voltage mode but the exposed value (indicative of light sensed by the pixel) is read out by sense turn on of the source follower by monitoring the reset line current (integrated on capacitor Ccmp to achieve the same constant charge passed from output line to reset line).

In the foregoing specification, the invention has been described with reference to specific examples of embodiments of the invention. It will, however, be evident that various modifications and changes may be made therein without departing from the broader spirit and scope of the invention as set forth in the appended claims.

Moreover, the terms "front," "back," "top," "bottom," "over," "under" and the like in the description and in the claims, if any, are used for descriptive purposes and not necessarily for describing permanent relative positions. It is understood that the terms so used are interchangeable under appropriate circumstances such that the embodiments of the invention described herein are, for example, capable of operation in other orientations than those illustrated or otherwise described herein.

Those skilled in the art will recognize that the boundaries between logic blocks are merely illustrative and that alternative embodiments may merge logic blocks or circuit elements or impose an alternate decomposition of functionality upon various logic blocks or circuit elements. Thus, it is to be understood that the architectures depicted herein are merely exemplary, and that in fact many other architectures may be implemented which achieve the same functionality.

Any arrangement of components to achieve the same functionality is effectively "associated" such that the desired functionality is achieved. Hence, any two components herein combined to achieve a particular functionality may be seen as "associated with" each other such that the desired functionality is achieved, irrespective of architectures or intermedial components. Likewise, any two components so associated can also be viewed as being "operably connected," or "operably coupled," to each other to achieve the desired functionality.

Furthermore, those skilled in the art will recognize that boundaries between the above described operations merely illustrative. The multiple operations may be combined into a single operation, a single operation may be distributed in additional operations and operations may be executed at least partially overlapping in time. Moreover, alternative embodiments may include multiple instances of a particular operation, and the order of operations may be altered in various other embodiments.

Any reference to any of the terms "comprise", "comprises", "comprising" "including", "may include" and "includes" may be applied to any of the terms "consists", "consisting", "consisting essentially of". For example—any of the circuits illustrated in any figure may include more components that those illustrated in the figure, only the components illustrated in the figure or substantially only the components illustrate din the figure.

Also for example, in one embodiment, the illustrated examples may be implemented as circuitry located on a single integrated circuit. Alternatively, the examples may be implemented as any number of separate integrated circuits or separate common mode noise chokes interconnected with each other in a suitable manner.

However, other modifications, variations and alternatives are also possible. The specifications and drawings are, accordingly, to be regarded in an illustrative rather than in a restrictive sense.

In the claims, any reference signs placed between parentheses shall not be construed as limiting the claim. The word 'comprising' does not exclude the presence of other elements or steps then those listed in a claim. Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements The mere fact that certain measures are recited in mutually different claims does not indicate that a combination of these measures cannot be used to advantage.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

We claim:

1. A device comprising a pixel and a readout circuit, wherein the pixel is coupled to the readout circuit via coupling lines that comprises an output line and a reset line; wherein the readout circuit comprises (a) a comparator that is configured to track a coupling line electrical parameter to generate a pulse that is responsive to value of the electrical parameter, and (b) a pulse width to digital converter for outputting a digital output signal that is responsive to a width of the pulse; wherein the coupling line electrical parameter is a reset line voltage developed on the reset line;

wherein the readout circuit comprises a current source for charging a bit line that is coupled to the pixel by supplying a predefined current to the bit line;

wherein the pixel comprises an output transistor;

wherein a state of the output transistor is determined, at least in part, in response to a level of a bit line voltage developed on the bit line; and wherein a value of the reset line voltage is responsive to the state of the output transistor.

2. The device according to claim 1 wherein during a reset phase of a double sampling process the output transistor is configured to change a state from a closed state to an open state when the bit line voltage equals a reset level minus a threshold voltage of the output transistor.

3. The device according to claim 1 wherein during a read phase of a double sampling process the output transistor is configured to change a state from a closed state to an open state when the bit line voltage equals a floating diffusion level minus a threshold voltage of the output transistor; wherein the floating diffusion level reflects an amount of light sensed by a photodiode of the pixel.

4. The device according to claim 1 wherein the comparator comprises a comparing transistor that has a gate that is coupled to the reset line.

5. A method for reading a pixel, the method comprises:
tracking, by a comparator of a readout circuit, a coupling line electrical parameter to generate a pulse that is responsive to value of the electrical parameter; wherein the coupling line is a reset line; wherein an output line and the reset line couple the pixel to the readout circuit; wherein the coupling electrical parameter is a reset line voltage developed on the reset line;
generating, by a pulse width to digital converter of the readout circuit, a digital output signal that is responsive to a width of the pulse;
charging, by a current source of the readout circuit, a bit line that is coupled to the pixel by supplying a predefined current to the bit line; wherein the pixel comprises an output transistor; and
determining a state of the output transistor, at least in part, in response to a level of a bit line voltage developed on the bit line; wherein a value of the reset line voltage is responsive to the state of the output transistor.

6. The method according to claim 5 comprising changing a state, during a reset phase of a double sampling process, of the output transistor from a closed state to an open state when the bit line voltage equals a reset level minus a threshold voltage of the output transistor.

7. The method according to claim 5 comprising changing a state, during a read phase of a double sampling process, of the output transistor from a closed state to an open state when the bit line voltage equals a floating diffusion level minus a threshold voltage of the output transistor; wherein the floating diffusion level reflects an amount of light sensed by a photodiode of the pixel.

8. The method according to claim 5 wherein the comparator comprises a comparing transistor that has a gate that is coupled to the reset line.

* * * * *